April 9, 1957 — T. E. SHOUP ET AL — 2,788,433
STUD WELDING GUN

Filed Dec. 20, 1954 — 2 Sheets-Sheet 1

INVENTORS
Thomas E. Shoup
Roger W. Shott
BY Lorenz J. Mowry

Clyde H. Haynes
their atty.

United States Patent Office 2,788,433
Patented Apr. 9, 1957

2,788,433

STUD WELDING GUN

Thomas E. Shoup, Amherst, Roger W. Sholle, Lorain, and Lorenz J. Mowry, Elyria, Ohio, assignors to Gregory Industries, Inc., Detroit, Mich., a corporation of Michigan Application December 20, 1954, Serial No. 476,316

2 Claims. (Cl. 219—98)

The present invention relates to a stud welding gun and in particular to the structure of a gun having a body constructed from a metal tube with plastic insulation material molded thereon.

In the past many stud welding guns have been designed with a plastic body or with a metal body. In many of these guns the welding cables have been left entirely outside of the gun for connection directly to the stud holder. In other guns the welding cable has been put partly inside the body of the gun and partly outside the body of the gun. In some of the prior guns the sliding support mechanism, which supports the stud for welding, was bearinged in metal parts, and in others this structure was bearinged in plastic or electrical insulation material.

The present stud welding gun has been designed to provide the necessary mechanical strength and at the same time, provide necessary electrical insulation so that it can be used to weld large studs which require exceptionally large welding currents.

One of the objects of the present invention, therefore, is to provide a stud welding gun which can be used in welding small sized studs which require relatively small welding currents or to weld large sized studs which require relatively large welding currents.

Another object of the present invention is to provide a stud welding gun which is efficient and accurate in its operation.

Another object of the invention is to provide a stud welding gun with a steel tube which supports the working parts of the gun and an electrical insulation material having a handle portion which insulates the electrical connections and welding cables positioned within the gun body.

Another object of the invention is to provide a stud welding gun which is safe and easy to use on an extremely large welding current and which is economical to manufacture.

Other objects and a fuller understanding of the invention will become apparent from the description and claims and the drawings in which:

Figure 1:
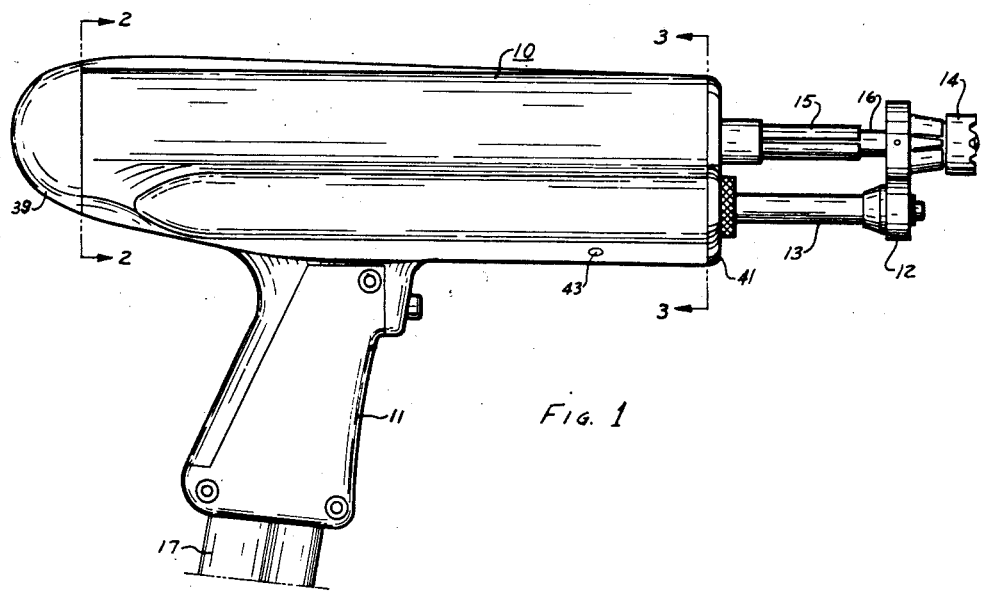
Figure 1 is a side elevational view of the stud welding gun.
Figure 2:
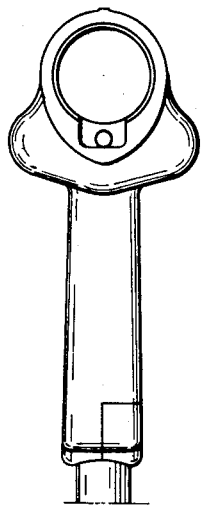
Figure 2 is a view taken along the line 2—2 of Figure 1.
Figure 3:
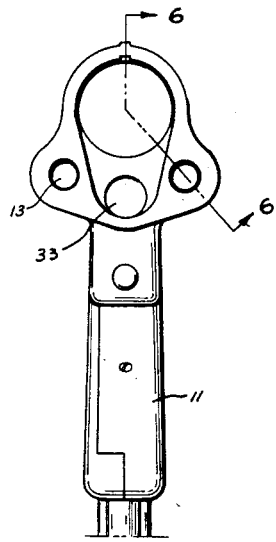
Figure 3 is a view taken along the line 3—3 of Figure 1.

The stud welding gun illustrated in Figure 1 has a body 10 provided with a handle 11. Extending outwardly from the front end of the body 10 is a ferrule holding device 12 including a leg 13 for holding a ferrule 14 against a work piece to which a stud is to be welded. Body 10 also slidably supports the stud holder 15 which supports a stud 16 to be welded to a work plate. The ferrule holding device 12 holds the ferrule 14 in alignment and around the end of the stud 16 during welding. Extending from the bottom of the handle 11 are the necessary welding and control cables 17 to connect the stud welding gun and thus the stud 16 to one side of the welding generator, the other side of which may be connected directly to ground or the work plate to which the stud is to be welded.

The welding circuits and controls used with this gun may be as illustrated in our pending application entitled "Stud Welding Method and Device," Serial No. 421,780, filed April 8, 1954.

Figure 4:
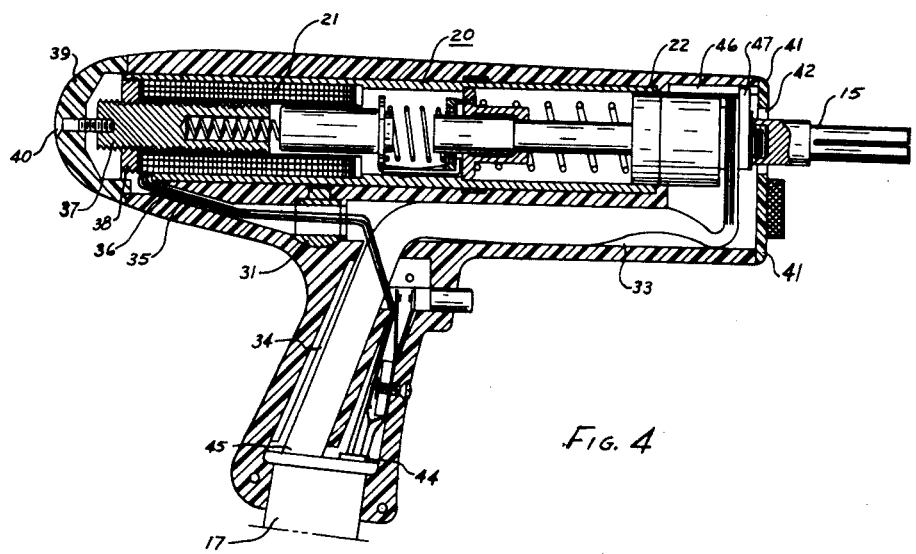
Figure 4 is a sectional view of the gun illustrated in Figure 1.
Figure 5:
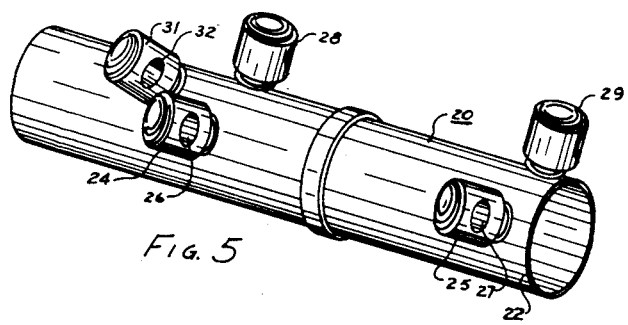
Figure 5 is an isometric view of the metal tube before electrical insulation material is molded thereon.
Figure 6:
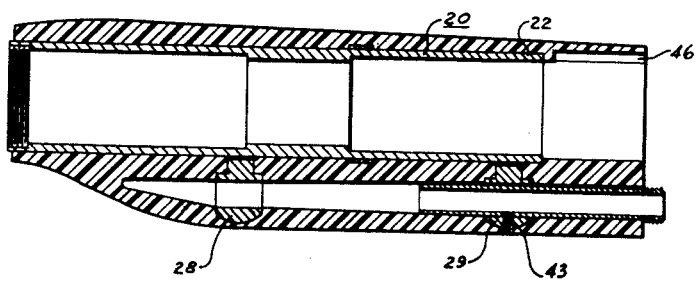
Figure 6 is a sectional view taken along the line 6—6 of Figure 3.

The gun body as is best illustrated in Figures 4 and 6, is constructed from a magnetizable metal tube 20 and plastic insulation material which is molded onto the metal tube 20. The metal tube 20 has a rear end which supports a solenoid 21 and a front end 22 which reciprocally supports the chuck or stud holder 15. The rear end of the stud tube 20 cooperates with the solenoid 21 to produce a magnetic field capable of lifting a stud from the plate for welding as is well known to those skilled in the art of stud welding.

The metal tube 20 has a first pair of longitudinally aligned leg holders 24 and 25 which as illustrated in Figure 6 extend radially outwardly therefrom. The leg holder 24 is positioned nearer the rear end of the tube 20 than the front end and the leg holder 25 is positioned nearer the front end of the tube. The leg holder 24 has a leg receiving hole 26 therein and the leg holder 25 has a leg receiving hole 27 therein. These holes 26 and 27 are coaxially aligned with their axis parallel to the axis of the tube and are adapted to receive the leg 13 of the ferrule holding device 12. In many instances it is desirable to have two legs on the ferrule holding device 12. For this reason a second pair of longitudinally aligned leg holders 28 and 29 extend radially outwardly from the metal tube and are permanently secured thereto. These leg holders 28 and 29 are also provided with leg receiving holes which are axially aligned and are parallel to the axis of the tube 20. The leg holders 24 and 25 are radially spaced from the leg holders 28 and 29.

The metal tube 20 is also provided with a projection 31 close to the rear end thereof. This projection 31 has a core rod hole 32 therein. The projection 31 extends radially outwardly from the tube 20 and is preferably positioned about half way between the pair of leg holders.

As is best illustrated in Figure 4, the electrical insulation material is molded onto this metal tube with the handle 11 aligned with the projection 31. The handle portion 11 extends radially outwardly from the metal tube 20 and about midway between the ends thereof. The leg holders 24, 25, 28 and 29 and the projection 31 are all embedded in the electrical insulation material or plastic. During the molding of the insulation material onto the metal tube 20, these leg holders and projection cooperate with suitable core rods from the mold and hold the core rods in proper alignment with the metal tube and keep them from bending under the pressures exerted during molding.

After the electrical insulation material has been completely cured and is permanently molded onto the metal tube, the core rods and all the parts of the mold are removed. Removing of these core rods from the leg holders 24 and 25 provides the leg holders and the electrical insulation material with a leg hole extending therethrough and parallel to the axis of the metal tube. A similar leg hole is provided for the leg holders 28 and 29. (See Figure 6.)

When the core rod is removed from the core rod hole 32 in projection 31, the projection and the insulation material have a conduit 33 extending from near the rear end of the tube through the handle portion to the front end of the tube 20. This conduit 33 extends generally parallel to the metal tube 20 and is adapted to receive a welding cable 45. The handle 11 also has a conduit 34 which merges with this conduit 33, thus the welding cable 17 enters the bottom of the handle 11, passes through the conduit 34, at least a part of conduit 33 and to the stud holder 15 at the front end of the metal tube 20. The welding cable is disposed entirely within the gun after it enters the handle. The solenoid coil also has lead wires 35 which must be accommodated within the body. This is accomplished by drilling a hole 36 from the rear end of the metal tube 20 to the end of conduit 33. The lead wires 35 from the solenoid pass through this hole 36, projection 31, a portion of conduit 33 and into conduit 34 in the handle. The leads 35 are connected to a suitably insulated control cable 44 which extends from the handle for connection to a control box (not shown).

The solenoid 21 has an adjustable stationary core 37 threadably supported by a bushing 38 which is threaded into the rear end of the metal tube 20. This stationary core 37 is screwed further into the metal tube 20 or backed partly out of it to change the arc length of a stud being welded to the work plate as is well known to those skilled in the art. The metal tube 20 is constructed from a material which will transmit magnetic flux established by the solenoid 13. The flux path for solenoid 13 includes that portion of the metal tube 20 around the solenoid, the threaded bushing 38 and the adjustable stationary core 37. In this way the metal tube not only serves as a magnetic return path for the solenoid, but also keeps the stud holder properly aligned therewith during its reciprocal movement in welding a stud to a work plate.

The adjustable stationary core 37 and the rear end of the metal tube 20 are covered by a cap made of insulation material. The outside surface of cap 39 blends with the outside surface of the electrical insulation material molded on the metal tube 20 and the cap is held in place by a screw 40 threaded into the stationary core 37.

The electrical insulation material molded on the metal tube extends from the front end thereof a distance sufficient to allow cable 45 to extend across the end of metal tube 20 for connection to the stud holder 15.

Molded into the insulation material is a keyway 46 which cooperates with a key 47 on the stud holder 15 to maintain reciprocal movement and prevent rotary movement of the holder relative to the gun body. This keyway 46 and the connection of the cable to the stud holder is covered by a cap 41 secured to the front end of the insulation material. The front cap 41 has a hole 42 therein, through which the stud holder 15 extends for reciprocally supporting the stud to be welded to a plate. The front cap 41 also has holes aligned with the leg receiving holes so that the leg or legs 13 may be fastened securely to the metal tube 10 by sliding them through the leg receiving holes in the leg holders 24, 25, 28 and 29. Axial movement of the legs 13 may be prevented by providing at least one of the leg holders 25 or 29 with a set screw 43 which may be tightened against the leg 13.

It is noted in the present design that the solenoid, the reciprocal stud holder parts and the ferrule holding assembly are all supported by a single metal tube, thus assuring accuracy in the axial alignment of the parts during operation. The welding cable and other electrical parts are correctly insulated and ensure safe operation of the tool for the average worker. It is also noted that the major adjustment of the tool as well as the working parts are located entirely within the tool to keep them in good working order even if the tool is used in rough or dirty places and by inexperienced users.

Although this invention has been described in its preferred form with a certain degree of particularity enabling others to reproduce the invention, it is understood that the present disclosure has been made by way of example and that numerous modifications and changes in the details may be resorted to without departing from the spirit and scope of the invention as defined in the claims which are made a part hereof.

The embodiments of the invention in which an exclusive property or privilege is claimed are defined as follows:

1. In a composite magnetizable metal and insulation material stud welding gun, adapted to be provided with leg holders, the provision of a magnetizable metal tube having a front end and a rear end, first and second pairs of longitudinally aligned support members permanently attached to said tube and extending radially outwardly therefrom, the members in the first pair being angularly spaced from the members in the second pair, each of said support members having a core rod receiving hole therein with the holes in each pair aligned on an axis extending parallel to the axis of the tube to receive a core rod, a projection permanently secured to said tube near the rear end thereof and extending radially outwardly therefrom, said projection having a core rod receiving hole therein aligned on an axis parallel to the axis of the tube and positioned between the pairs of members, said members and said projection constituting means for supporting core rods in parallel spaced and reinforcing relation with said tube during the molding of insulation thereon, and a single mass of insulation permanently molded on and entirely around said tube, said members, said projection and core rods supported thereby during molding, the core rods in said pairs of members during the molding of the insulation providing leg receiving conduits parallel with the axis of the tube.

2. In a composite magnetizable metal and insulation material stud welding gun adapted to be provided with leg holders, the provision of a magnetizable metal tube having a front end and a rear end, first and second pairs of longitudinally aligned support members permanently attached to said tube and extending radially outwardly therefrom, the members in the first pair being angularly spaced from the members in the second pair, each of said support members having a core rod receiving hole therein with the holes in each pair aligned on an axis extending parallel to the axis of the tube to receive a core rod, a projection permanently secured to said tube near the rear end thereof and extending radially outwardly therefrom, said projection having a core rod receiving hole therein aligned on an axis parallel to the axis of the tube and positioned between the pairs of members, said members and said projection constituting means for supporting core rods in parallel spaced and reinforcing relation with said tube during the molding of insulation thereon, and a single mass of insulation permanently molded on and entirely around said tube, said members, said projections and core rods supported thereby during molding, said insulation having a handle portion extending generally radially outwardly therefrom between the ends thereof, the core rods in said pairs of members during the molding of the insulation providing leg receiving conduits parallel with the axis of the tube and the core rod in said projection providing a welding cable conduit.

References Cited in the file of this patent

UNITED STATES PATENTS

| | | |
|---|---|---|
| Re. 22,310 | Nelson | May 11, 1943 |
| 1,333,004 | Vaughn | Mar. 9, 1920 |
| 2,568,222 | Crecca | Sept. 8, 1951 |